US006995883B2

(12) United States Patent
Deinhammer et al.

(10) Patent No.: US 6,995,883 B2
(45) Date of Patent: Feb. 7, 2006

(54) SECURITY DOCUMENT WITH AN OPTICAL SECURITY AREA

(75) Inventors: Harald Deinhammer, Vienna (AT); Franz Loos, Vienna (AT)

(73) Assignee: Oesterreichische Banknoten- und Sicherheitsdruck GmbH, Vienna (AT)

( * ) Notice: Subject to any disclaimer, the term of this patent is extended or adjusted under 35 U.S.C. 154(b) by 0 days.

(21) Appl. No.: 10/983,517

(22) Filed: Nov. 8, 2004

(65) Prior Publication Data

US 2005/0094229 A1 May 5, 2005

Related U.S. Application Data

(63) Continuation of application No. PCT/AT03/00135, filed on May 12, 2003.

(30) Foreign Application Priority Data

May 14, 2002 (AT) ............................... A 736/2002

(51) Int. Cl.
*G03H 1/00* (2006.01)

(52) U.S. Cl. .............................. 359/2; 359/1; 359/558; 382/100; 283/86

(58) Field of Classification Search .................... 359/1, 359/2, 558, 569; 382/100; 283/86, 93
See application file for complete search history.

(56) References Cited

U.S. PATENT DOCUMENTS 6,317,226 B1 11/2001 Yeh et al.
2004/0076310 A1 * 4/2004 Hersch et al. .............. 382/100

FOREIGN PATENT DOCUMENTS

EP 0 384 897 A1 8/1990
WO WO 99/01291 A2 1/1999
WO WO 02/00446 A 1/2002

* cited by examiner

*Primary Examiner*—Fayez G. Assaf
(74) *Attorney, Agent, or Firm*—Henry M. Feiereisen

(57) ABSTRACT

A security document, such as a banknote, includes an optical security area having a first periodic optical structure and a security sign provided on the security area and configured to circumscribe a second periodic optical structure which is disposed in offset relationship to the first periodic optical structure. Arranged on the security area is a see-through element for enhancing recognizability of the security sign on the security area. The see-through element defines hereby a viewing zone which covers part of the security sign so as to render this part of the security sign visible by the naked eye.

17 Claims, 3 Drawing Sheets

SECURITY DOCUMENT WITH AN OPTICAL SECURITY AREA

CROSS-REFERENCES TO RELATED APPLICATIONS

This application is a continuation of prior filed copending PCT International application no. PCT/AT03/00135, filed May 12, 2003, which designated the United States and on which priority is claimed under 35 U.S.C. §120, the disclosure of which is hereby incorporated by reference, and which claims the priority of Austrian Patent Application, Serial No. A 736/2002, filed May 14, 2002, pursuant to 35 U.S.C. 119(a)–(d).

BACKGROUND OF THE INVENTION

The present invention relates, in general, to a security document, such as a banknote, for example.

Nothing in the following discussion of the state of the art is to be construed as an admission of prior art.

Security documents of a type involved here include an optical security area and a security sign which is also known as "hidden images" and is normally difficult to recognize by the naked eye. Examples of security signs include hidden words, images or geometrical figures. Such security areas are often directly printed onto the security document and thus can be counterfeit in a relatively simple way by using high-resolution copying machines, or can also be integrated in the security document by professional counterfeiters in a relatively simple manner by scanning and subsequent image processing.

It would therefore be desirable and advantageous to provide an improved value document to obviate prior art shortcomings and to show a higher level of security against counterfeiting.

SUMMARY OF THE INVENTION

According to one aspect of the present invention, a security document, such as a banknote, includes an optical security area having a first periodic optical structure and a security sign provided on the security area and configured to circumscribe a second periodic optical structure which is disposed in offset relationship to the first periodic optical structure, and a see-through element for enhancing recognizability of the security sign on the security area, wherein the see-through element is constructed for arrangement on the security area to thereby define a viewing zone which covers part of the security sign so as to render this part of the security sign visible by the naked eye.

After forming the security area with the incorporated security sign, the separately produced see-through element is firmly connected to the security document. There are many ways to secure the see-through element to the security area, ranging from gluing to hot stamping. A layered structure of the see-through element on the security document may also be possible. As a result of the see-through element which is applied to the surface of the security document, part of the security sign incorporated on the security document can be made readily apparent, whereas the remaining uncovered area of the security sign still remains hidden to the naked eye. As a result, the security sign on the security document is easier to find, thus reducing the checking periods. The see-through element renders part of the "hidden images" visible. This constitutes per se a security feature that is difficult to imitate because—as a result of the moire effect—a characteristic effect is obtained which cannot be imitated by a mere color copy. The check for authenticity can be carried out with an additional see-through element, e.g. by means of a transparent film or transparent card with a line grid or ruled grating, lenticular lens or the like, through which the security area is viewed. A criterion for the security against counterfeiting is the high dimensional accuracy that is required when the see-through element is applied onto the security document and the positional precision relative to the security area. Any inconsistencies in the pattern of the contours of the security sign, when viewed with the additional see-through element at the transition point between the region covered by the applied see-through element and the remaining uncovered security area, suggest the presence of a forged security document. In the case of a genuine security document, visible and invisible parts of the security sign show a complete and smooth course of the contours of the security sign, when viewed through an additional see-through element placed on the security document.

According to another feature of the present invention, the see-through element may be sized to cover half of the security area. In this way, the position of the security sign can be detected at a glance.

According to another feature of the present invention, the see-through element has an optical structuring which can be similar or identical to the first or second periodic optical structures. The two-dimensional configuration required for the first and second periodic structures is thus also applicable to the applied see-through element, so that the thickness of the see-through element can be kept to a minimum. The see-through element therefore projects only marginally beyond the security document and does not adversely affect the use of the security document. The security area can, however, also be arranged in a recess of the security document surface and the see-through element can be embedded in this recess.

According to another feature of the present invention, the first periodic optical structure and the second periodic optical structure may each be configured as parallel grid-type lines, parallel line grid, or point grid, with the distance between the adjacent grid-type lines, parallel line grids or point grids being 1.5 times a line thickness of the grid-type lines, parallel line grids or point grids. Ruled gratings and grids of this kind can be produced very easily by printing, and lead to a clearly recognizable contrast.

According to another feature of the present invention, the first periodic optical structure can be arranged in offset relationship parallel to the second periodic optical structure at an offset distance. The parallel offset of the first and second periodic optical structures results in a clearly recognizable contrast, when viewed through a see-through element. Suitably, the offset distance is approximately equal to half the distance between the grid-type lines, the parallel line grid or point grids of the first or second periodic optical structure.

According to another feature of the present invention, the see-through element may be formed by a transparent film with parallel grid-type lines, a parallel line grid or point grids, which may be glued onto the security document for example.

According to another feature of the present invention, the see-through element may be formed by a film having parallel, oblong slots. Suitably, the film is a metallized plastic film.

This kind of see-through element can be hot-stamped in a simple manner onto the surface of the security document in accordance with the invention. Moreover, the film can be a component of a hologram film which is hot-stamped onto the security document. The hologram and the see-through element can be applied in one operation onto the security document.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
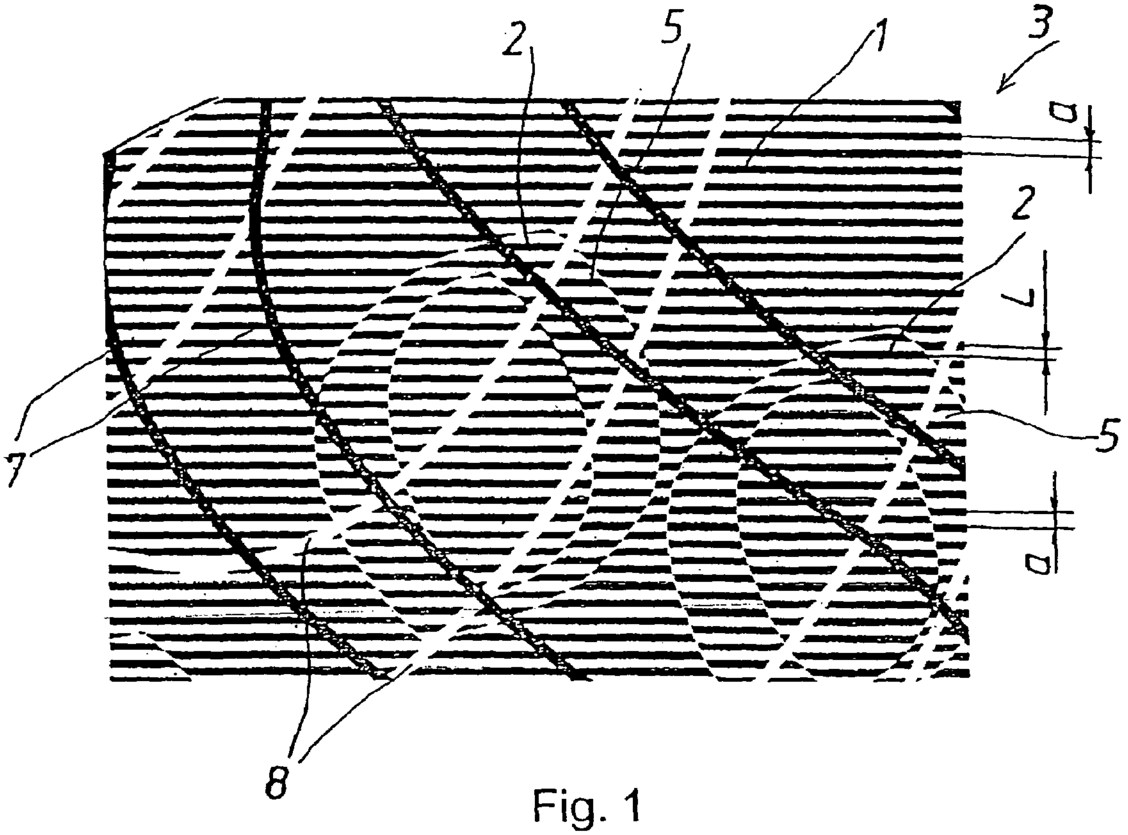
FIG. 1 is a fragmentary top view, on an enlarged scale, of a security document.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

It is to be understood by persons skilled in the art that the term "security document" is used here in a generic sense and the principles described in the following description with respect to the security document are equally applicable to any other type of value-bearing document which generally follows the concepts outlined here. Examples include banknotes, checks, traveller checks, shares, ID cards, check cards or the like which have a printable surface and are to be protected against prohibited duplication.

Turning now to the drawing, and in particular to FIG. 1, there is shown a top view, on an enlarged scale, of a section of a security document having an optical security area 3 which is traversed by white curved lines 8 and black curved lines 7. The white and black curved lines 8 form hereby part of a superordinated graphical design of the security document but do not form part of the present invention. The security area 3 has further incorporated therein a first periodic optical structure in the form of printed parallel grid-type lines 1 which are held in black color against a white background. The periodicity is established by a same spacing between the grid-type lines 1. Currently preferred is a distance a between neighboring grid-type lines 1 of 1.5 times a line thickness of the grid-type lines 1.

The security area 3 includes a security sign 5 whose contours circumscribe a second optical structure in the form of printed parallel grid-type lines 2 in black color on white background. The grid-type lines 2 have also a same mutual distance a as the grid-type lines 1 of the first periodic optical structure, but are offset in parallel relationship to the grid-type lines 1 of the first periodic optical structure at an offset distance L. The offset distance L is approximately half the distance a. The color contrast between the grid-type lines 1 and grid-type lines 2, on one hand, and the background, on the other hand, can be randomly selected within the scope of the present invention.

Persons skilled in the art will understand that the illustration of the security document of FIG. 1 is greatly exaggerated in order to depict the security sign 5. Of course, through suitable selection of the line distance and the line thickness, the security sign 5 will disappear nearly completely in the security area 3 and is not readily visible with the naked eye.

Figure 3:
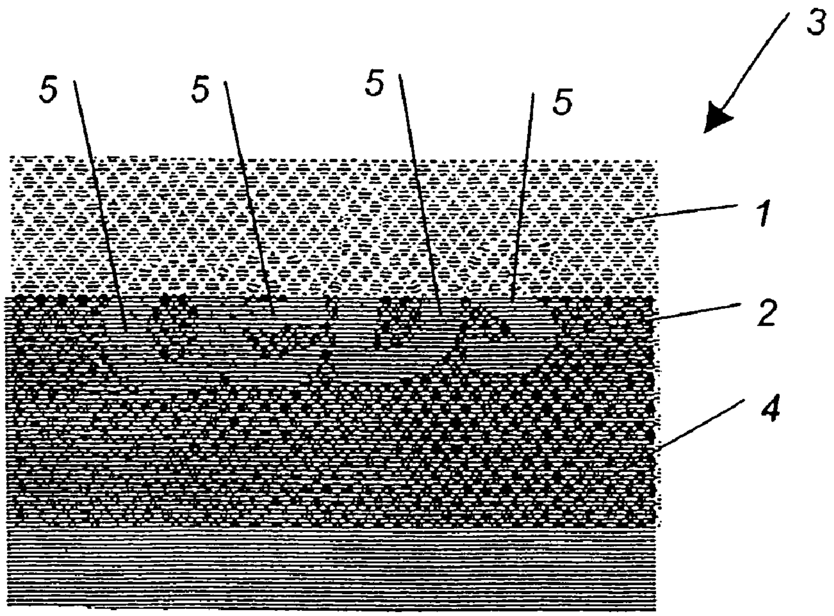
FIG. 3 is a top view of another security document in combination with a see-through element.

The first and second periodic optical structures may also be realized in form of point grids, as shown by way of example in FIG. 3, parallel line grids or other optical periodic form, with the second optical periodic structure 2 being differentiated from the first optical periodic structure 1 by the contours of the security sign 5.

Figure 2:
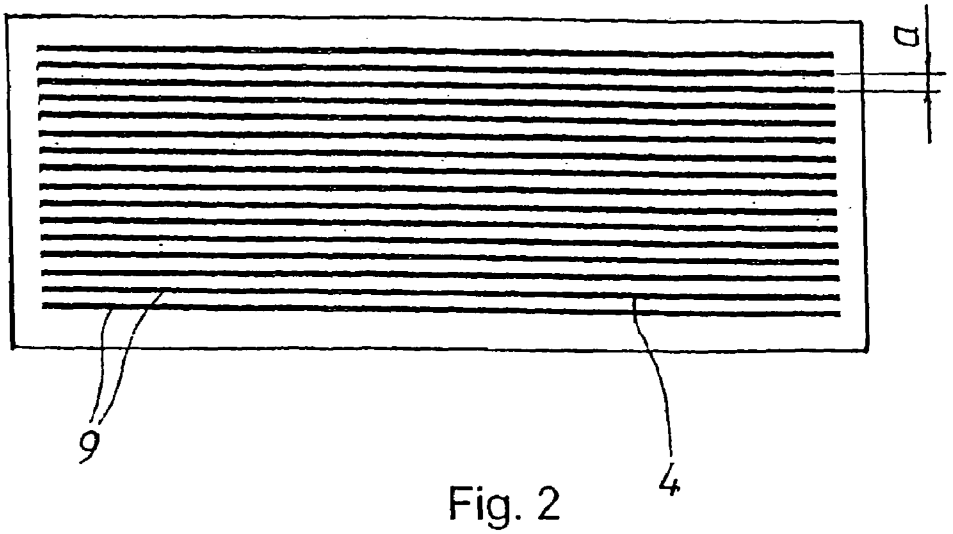
FIG. 2 is a top view of one embodiment of a see-through element for application upon the security document of FIG. 1.

The detection or recognition of the security sign 5 can be realized by viewing with a see-through element 4 as shown in FIG. 2. The see-through element 4 has an optical structuring which is similar or identical to the first or second optical structures 1, 2. Of course, other suitable see-through elements such as lenticular lenses are conceivable as well. The see-through element 4 is formed by a transparent film with parallel grid-type lines 9 which are arranged at the distance a in parallel relationship to each other. When placing the see-through element 4 on the security area 3, and aligning the grid-type lines 9 in parallel position relative to the grid-type lines 1, 2, the security sign 5 will appear darker or brighter relative to the white background depending on the offset of the grid-type lines 9 and the grid-type lines 1, 2 so that the grid-type lines 1, 2 become visible.

Of course, the film 4 may also have another optical periodic form, e.g. a point grid or the like.

In accordance with the invention, the see-through element 4 is applied to a region of the security area 3 in such a way that the part of the security sign 5 that is covered by the see-through element 4 can be recognized with the naked eye, as shown in FIG. 3. Therefore, the see-through element 4, which is a component produced separately from the security document, is superposed over the security area 3 to partially cover the security area 3. The manner by which the see-through element 4 can be attached to the security area 3 is not subject to any restrictions. Examples include gluing or hot stamping. However, other methods which generally follow the concepts outlined here are considered to be covered by this disclosure.

In FIG. 3, the first and second optical periodic structures 1, 2 are each formed by mutually offset point grids. As can be seen in FIG. 3, the see-through element 4 covers the lower half of the security sign 5 which is hidden in the security area 3 and which is composed of a letter sequence "oebs". The thus-configured security area 3 provides a high degree of security against counterfeiting because the application of the see-through element 4 requires precision and the retention thereof on the security document can be assured reliably only with respectively sophisticated equipment.

Attempts to counterfeit the security document by providing the film of the see-through element 4 with a prefabricated lettering and applying the see-through element 4 to the security area 3 are futile because the uncovered area of the lettering of the security sign 5 does not precisely match the pattern of the lettering on the film 4. The congruence in the transition from the film 4 to the printed security area 3 can be easily proven, e.g., by viewing with the aid of a lenticular lens. Even minor deviations will lead to a strongly distorted contrast in the transitional region.

The entire arrangement as shown in FIG. 3 cannot be copied in its entirety for the purpose of counterfeiting because the point grid can be increased beyond the resolution threshold of a copying machine.

Figure 4:
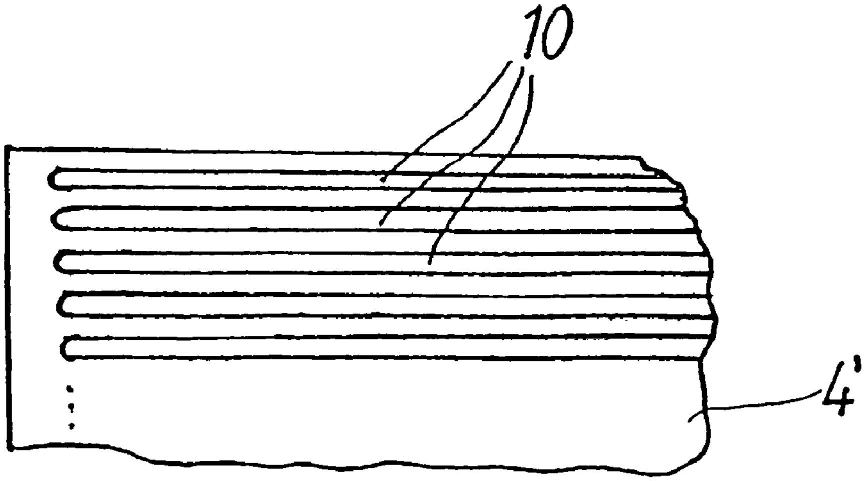
FIG. 4 is a fragmentary top view of another embodiment of a see-through element for application upon a security document.

FIG. 4 shows another variant of a see-through element 4' which is formed by a film, which is preferably realized as a metallized plastic film and has parallel oblong slots 10. Such a structure can also be produced with very small distances in a very precise manner, e.g. by etching or selective demetallization, and can be hot-stamped onto a security document for example. There is also the possibility to integrate in a hologram the film 4', having slots 10 or demetallized areas, so that it becomes a component of the hologram.

Figure 5:
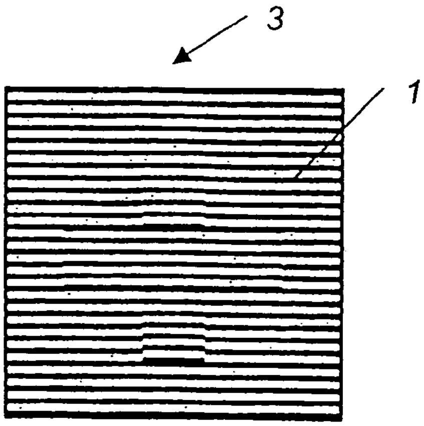
FIG. 5 is a top view of another security document.

FIG. 5 shows the security area 3 of another security document in accordance with the invention having parallel grid-type lines 1. According to FIG. 6, the see-through element 4 can be applied to the security area 3 in such a way that a portion of the security sign 5 is always recognizable with the naked eye. When checking the security area 3 in its entirety, the application of an additional see-through element 6 becomes necessary in order to render the entire security sign 5 visible, as shown in FIG. 7.

Figure 6:
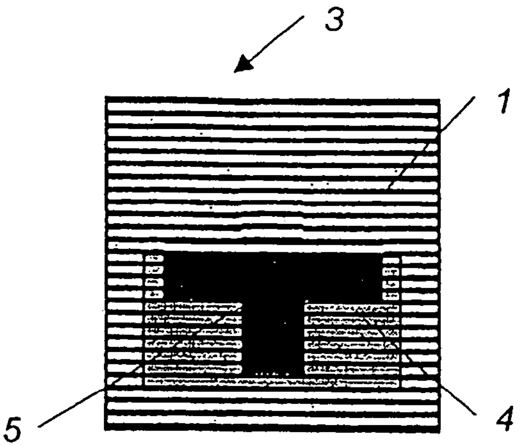
FIG. 6 is a top view of the security document of FIG. 5, showing in detail the security area with applied see-through element.
Figure 7:
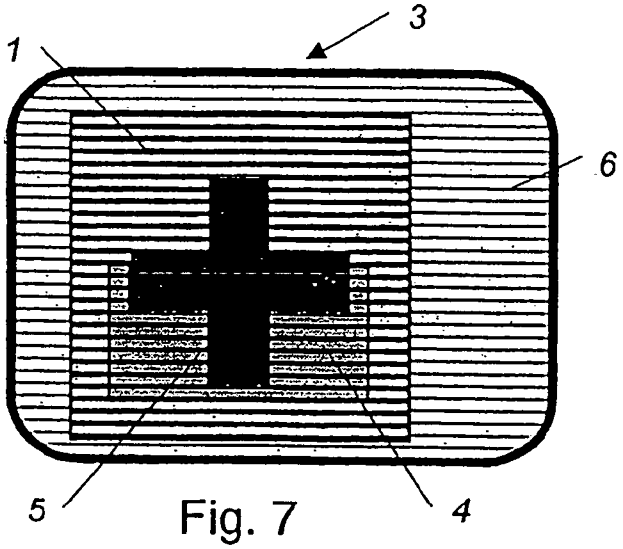
FIG. 7 is a top view of the security document of FIG. 6, showing in detail the security area with application of an additional see-through element.
Figure 8:
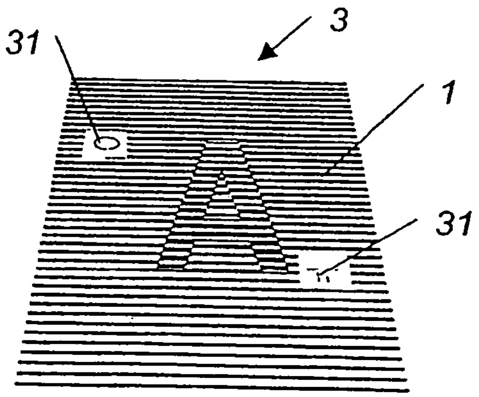
FIG. 8 is a top view of still another security document.
Figure 9:
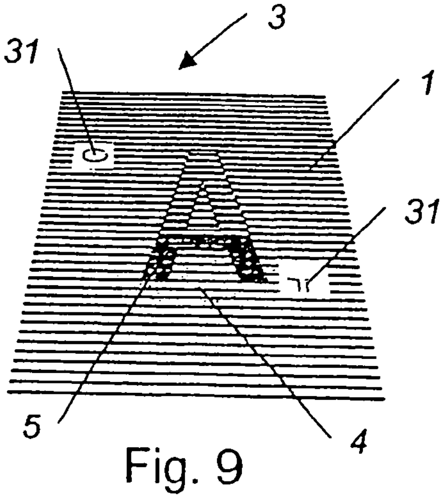
FIG. 9 is a top view of the security document of FIG. 8, showing in detail the security area with applied see-through element.
Figure 10:
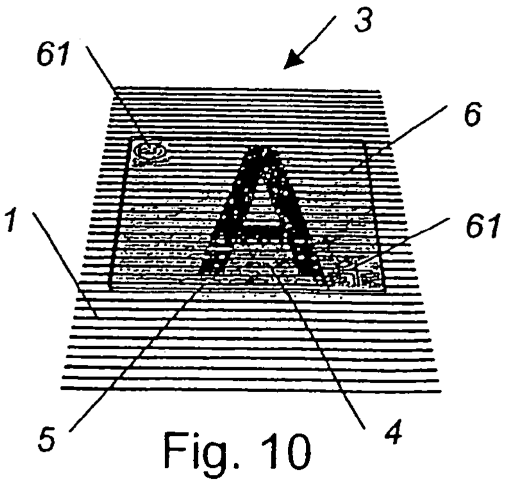
FIG. 10 is a top view of the security document of FIG. 9, showing in detail the security area with application of an additional see-through element.

FIGS. 8 to 10 show a further embodiment of the security area 3 of a security document in accordance with the invention in analogy to FIGS. 5 to 7. In order to facilitate a rapid and precise application of the additional see-through element 6, the additional see-through element 6 can have markings 61 which can be brought into coincidence with markings 31 on the security document in accordance with the invention. The security area 3, and in particular the see-through element 4 and/or the line grid or point grid can additionally be provided with further security features such as fluorescence colors or effect colors in order to further increase security.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A security document, comprising:

an optical security area having a first periodic optical structure and a security sign provided on the security area and configured to circumscribe a second periodic optical structure which is disposed in offset relationship to the first periodic optical structure; and a see-through element for enhancing recognizability of the security sign on the security area, said see-through element constructed for arrangement on the security area to thereby define a viewing zone which covers part of the security sign so as to render said part of the security sign visible by the naked eye, wherein the see-through element is securely fixed to the security area covering part of the security sign.

2. The security document of claim 1, wherein the first periodic optical structure is a pattern selected from the group consisting of parallel grid-type lines, parallel line grid, and point grid.

3. The security document of claim 1, wherein the second periodic optical structure is a pattern selected from the group consisting of parallel grid-type lines, parallel line grid, and point grid.

4. The security document of claim 1, wherein the see-through element is sized to cover half of the security area.

5. The security document of claim 1, wherein the see-through element has an optical structuring which is similar or identical to the first or second periodic optical structures.

6. The security document of claim 1, wherein the first periodic optical structure and the second periodic optical structure are each configured as a pattern selected from the group consisting of parallel grid-type lines, parallel line grid, and point grid, with the distance between the adjacent grid-type lines, parallel line grids or point grids being 1.5 times a line thickness of the pattern.

7. The security document of claim 6, wherein the first periodic optical structure is arranged in offset relationship parallel to the second periodic optical structure at an offset distance.

8. The security document of claim 7, wherein the offset distance is approximately equal to half the distance between the grid-type lines, the parallel line grid or point grid of the first or second periodic optical structure.

9. The security document of claim 1, wherein the see-through element is formed by a transparent film having a pattern selected from the group consisting of parallel grid-type lines, parallel line grid, and point grid.

10. The security document of claim 1, wherein the see-through element is glued onto the security area.

11. The security document of claim 1, wherein the see-through element is hot-stamped onto the security area.

12. The security document of claim 1, wherein the see-through element is formed by a film having parallel, oblong slots.

13. The security document of claim 12, wherein the film is a metallized plastic film.

14. The security document of claim 12, wherein the film is a component of a hologram film which is hot-stamped onto the security document.

15. In combination:

a security document, comprising:

an optical security area having a first periodic optical structure and a security sign provided on the security area and configured to circumscribe a second periodic optical structure which is disposed in offset relationship to the first periodic optical structure, and a see-through element for enhancing recognizability of the security sign on the security area, said see-through element constructed for arrangement on the security area to thereby define a viewing zone which covers part of the security sign so as to render said part of the security sign visible by the naked eye; and an additional see-through element for placement upon an uncovered area of the security sign to thereby allow recognition of the security sign in its entirety for check of authenticity.

16. The combination of claim 15, wherein the additional see-through element is a transparent film having a pattern selected from the group consisting of line grid, ruled grating, and lenticular lens.

17. The combination of claim 15, wherein the additional see-through element is a transparent card having a pattern selected from the group consisting of line grid, ruled grating, and lenticular lens.

* * * * *